United States Patent
Majeti et al.

(10) Patent No.: US 8,880,625 B2
(45) Date of Patent: Nov. 4, 2014

(54) AUTOMATIC EXPIRATION OF MESSAGES COMMUNICATED AMONG END USER COMMUNICATION DEVICES

(75) Inventors: Venkata C. Majeti, Naperville, IL (US); Saiprasad Pennabadi, Naperville, IL (US)

(73) Assignee: Loment, Inc., Naperville, IL (US)

( * ) Notice: Subject to any disclaimer, the term of this patent is extended or adjusted under 35 U.S.C. 154(b) by 428 days.

(21) Appl. No.: 13/136,720

(22) Filed: Aug. 9, 2011

(65) Prior Publication Data

US 2012/0254324 A1  Oct. 4, 2012

Related U.S. Application Data

(63) Continuation-in-part of application No. 13/134,591, filed on Jun. 10, 2011, which is a continuation-in-part of application No. 13/068,340, filed on May 9, 2011, which is a continuation-in-part of application No. 13/065,839, filed on Mar. 31, 2011.

(51) Int. Cl.
  *G06F 15/16* (2006.01)
  *G06F 15/167* (2006.01)
  *H04L 12/58* (2006.01)
  *H04L 29/06* (2006.01)

(52) U.S. Cl.
  CPC ............ *H04L 51/18* (2013.01); *H04L 51/26* (2013.01); *H04L 63/123* (2013.01); *H04L 51/22* (2013.01); *H04L 51/38* (2013.01)
  USPC .......................... 709/206; 709/207; 709/215

(58) Field of Classification Search
  CPC ...... G06Q 10/107; H04L 51/18; H04L 51/22; H04L 51/26; H04L 63/123; G06F 21/10
  USPC .......................................... 709/206–207, 215
  See application file for complete search history.

(56) References Cited

U.S. PATENT DOCUMENTS 6,938,065 B2 * 8/2005 Jain ............................. 709/201
2003/0040300 A1 * 2/2003 Bodic et al. .................. 455/412
(Continued)

FOREIGN PATENT DOCUMENTS

WO  98/58321  12/1998
WO  00/51032   8/2000

OTHER PUBLICATIONS

ETSI 3GPP, "Technical Realization of the Short Message Service (SMS) Point to Point (PP) (3GPP TS 03.40 version 7.5.0 Release 1998)", GSM, version 7.5.0, Release 1998.*

*Primary Examiner* — Brian J Gillis
*Assistant Examiner* — Shean Tokuta
(74) *Attorney, Agent, or Firm* — Carmen Patti Law Group, LLC

(57) ABSTRACT

An exemplary method is implemented by a first end-user communication device for processing a received electronic communication that includes a digital packet having a header segment and a user data segment. The user data segment contains a first command and a user message, where the first command contains a first parameter representing automatic expiration and an associated first value representing how long the user message will be available for display by the first end-user communication device. Under the control of an enhanced services application program, the user message in clear text format is generated for display on a screen of the first end-user communication device. A determination is made of the expiration of the time set by the first value, and upon the expiration, the clear text user message is thereafter prevented from being accessed by the first end-user communication device.

6 Claims, 11 Drawing Sheets

(56) References Cited

U.S. PATENT DOCUMENTS

| | | | |
|---|---|---|---|
| 2003/0065738 A1* | 4/2003 | Yang et al. | 709/215 |
| 2003/0236981 A1* | 12/2003 | Marmigere et al. | 713/168 |
| 2005/0138390 A1* | 6/2005 | Adams et al. | 713/185 |
| 2006/0234732 A1* | 10/2006 | Kim | 455/466 |
| 2007/0293195 A1* | 12/2007 | Angwin et al. | 455/412.2 |
| 2008/0095336 A1* | 4/2008 | Tysowski et al. | 379/88.22 |
| 2008/0195714 A1* | 8/2008 | Viidu et al. | 709/206 |
| 2008/0238709 A1* | 10/2008 | Vaziri et al. | 340/825.22 |
| 2008/0242326 A1* | 10/2008 | Hsu | 455/466 |
| 2008/0310331 A1* | 12/2008 | Bakker et al. | 370/310 |
| 2010/0042690 A1* | 2/2010 | Wall | 709/206 |
| 2010/0287249 A1* | 11/2010 | Yigang et al. | 709/206 |
| 2011/0143784 A1* | 6/2011 | Ahluwalia | 455/466 |
| 2011/0239116 A1* | 9/2011 | Turner et al. | 715/705 |

* cited by examiner

|     | 0 | 1 | 2 | 3 | 4 | 5 | 6 | 7 | 8 | 9 | 10 | 11 | 12 | 13 | 14 | 15 | 16 | 17 | 18 | 19 |
|-----|---|---|---|---|---|---|---|---|---|---|----|----|----|----|----|----|----|----|----|----|
| Ex1 | / | / | P | : | 1 | 0 | 0 | D | E | A | C  | T  | I  | V  | A  | T  | E  |    |    |    |
| Ex2 | / | / | P | : | 1 | 0 | 0 | W | I | P | E  | O  | U  | T  |    |    |    |    |    |    |
| Ex3 | / | / | P | : | 0 | 4 | 0 | H | E | L | L  | O  |    | F  | M  |    | M  | I  | K  | E  |
| Ex4 | / | / | P | : | 0 | 4 | 4 | E | 0 | 0 | 6  | H  | E  | L  | L  | O  |    | F  | M  | .... |
| Ex5 | / | / | P | : | 0 | 3 | 7 | L | 0 | 0 | 0  | 1  | 2  | 1  | M  | E  | S  | 1  | .... |    |
| Ex6 | / | / | P | : | 0 | 3 | 7 | L | 0 | 0 | 0  | 1  | 2  | 2  | M  | E  | S  | 2  | .... |    |
| Ex7 | / | / | P | : | 0 | 1 | 12 | E | 0 | 0 | 5 | 255 | L | 0  | 0  | 0  | 2  | 2  | 1  |    |
| Ex8 | / | / | P | : | 0 | 1 | 7 | L | 0 | 0 | 0  | 2  | 2  | 2  | M  | E  | S  | 2  | .... |    |
| Ex9 |   |   |   |   |   |   |   |   |   |   |    |    |    |    |    |    |    |    |    |    |

FIG. 5

| Value of byte 5 | Background Color | Specified Message Priority |
|---|---|---|
| 1 | Red | Emergency message, requires immediate attention |
| 2 | Yellow | Urgent message, requires attention soon |
| 3 | Green | Normal communication, response is expected |
| 4 | Gray | Normal communication, response is not expected |
| | White | Public and unsecured communication |
| 5 | Red | Emergency message, requires immediate attention |
| 6 | Yellow | Urgent message, requires attention soon |
| 7 | Green | Normal communication, response is expected |
| 8 | Gray | Normal communication, response is not expected |
| 9 | Black | High Security Special Encryption/Decryption |

FIG.11

AUTOMATIC EXPIRATION OF MESSAGES COMMUNICATED AMONG END USER COMMUNICATION DEVICES

CROSS REFERENCE TO RELATED APPLICATIONS

This application is a continuation-in-part of U.S. application Ser. No. 13/134,591 filed Jun. 10, 2011 entitled PRIORITY OF OUTBOUND MESSAGES COMMUNICATED AMONG END USER COMMUNICATION DEVICES which is a continuation-in-part of U.S. application Ser. No. 13/068,340 filed May 9, 2011, and entitled MANAGEMENT FOR INFORMATION COMMUNICATED AMONG END USER COMMUNICATION DEVICES, which is a continuation-in-part of U.S. application Ser. No. 13/065,839 filed Mar. 31, 2011, and entitled "UBIQUITOUS USER CONTROL FOR INFORMATION COMMUNICATED AMONG END USER COMMUNICATION DEVICES".

BACKGROUND

This invention relates to communications among end user communication devices and more specifically to the automatic expiration, i.e. deletion, of received messages on an end user communication device, especially but not limited to, wireless end user communication devices, which may be made by different manufacturers and/or have different operating systems.

Wireless communication devices are now prevalent throughout all developed countries of the world. Although cellular telephones are currently the most widespread, other types of wireless communication devices include personal digital assistants, laptop computers with Wi-Fi and/or telecommunication carrier communication support, and various types of "pads" that provide visual displays that are larger than conventional cellular telephones but typically smaller than the displays of a laptop computer. Wireless voice communications between mobile devices utilizing different types of communication protocols, e.g. analog, TDMA, CDMA, VOIP, etc., are supported by different telecommunication carriers which provide appropriate communication protocol interfaces/gateways to facilitate voice communications between mobile units using different communication protocols.

Various types of transport layer communication protocols are supported by wireless communication devices. For example, text messaging, short messaging service (SMS), multimedia messaging service (MMS), email such as by simple mail transfer protocol (SMTP), and instant messaging utilizing hypertext transfer protocol (HTTP) are available. Each type service is supported by a transport layer communication protocol that is part of the telecommunication signaling structure associated with the transport of user communications and the communication of telecommunication infrastructure commands and signals. In order to prevent network congestion and/or overload, telecommunication networks may utilize a time to live (TTL) parameter for messages being transmitted through the network. The TTL parameter establishes a maximum time that a message is allowed to remain active in the network pending delivery. This permits the network to discard messages after the TTL time expires in order to prevent the network from being congested with an accumulating number of messages that cannot be delivered. The TTL parameter is only used within the transport network and has no impact on messages that are delivered to users.

There exists a need to provide a user who originates a message with the ability to determine how long the delivered message may be accessed, e.g. displayed, on the recipient's communication device.

SUMMARY

It is an object of this embodiment of the present invention to satisfy a need for improved control of received messages.

In accord with an embodiment of the present invention, an exemplary method is implemented by a first end-user communication device for processing a received electronic communication that includes a digital packet having a header segment and a user data segment. The user data segment contains a first command and a user message, where the first command contains a first parameter representing automatic expiration and an associated first value representing how long the user message will be available for display by the first end-user communication device.

Under the control of an enhanced services application program, the user message in clear text format is generated for display on a screen of the first end-user communication device. A determination is made of the expiration of the time set by the first value, and upon the expiration, the clear text user message is thereafter prevented from being accessed by the first end-user communication device.

An embodiment of the present invention includes the end-user communication device that executes this method.

An embodiment of the present invention also includes a computer program product, comprising a computer usable tangible medium having a computer readable program code embodied therein, where the computer readable program code is adapted to be executed to implement this method.

Embodiments of the present invention further include all the steps, elements and features recited in the claims.

DESCRIPTION OF THE DRAWINGS

Features of exemplary implementations of the invention will become apparent from the description, the claims, and the accompanying drawings in which:

FIG. 5 is a table where each row represents a transmission of information in accordance with an embodiment of the present invention.

FIG. 11 is a table where each row represents a different message priority in accordance with an embodiment of the present invention.

DETAILED DESCRIPTION

Figure 1:
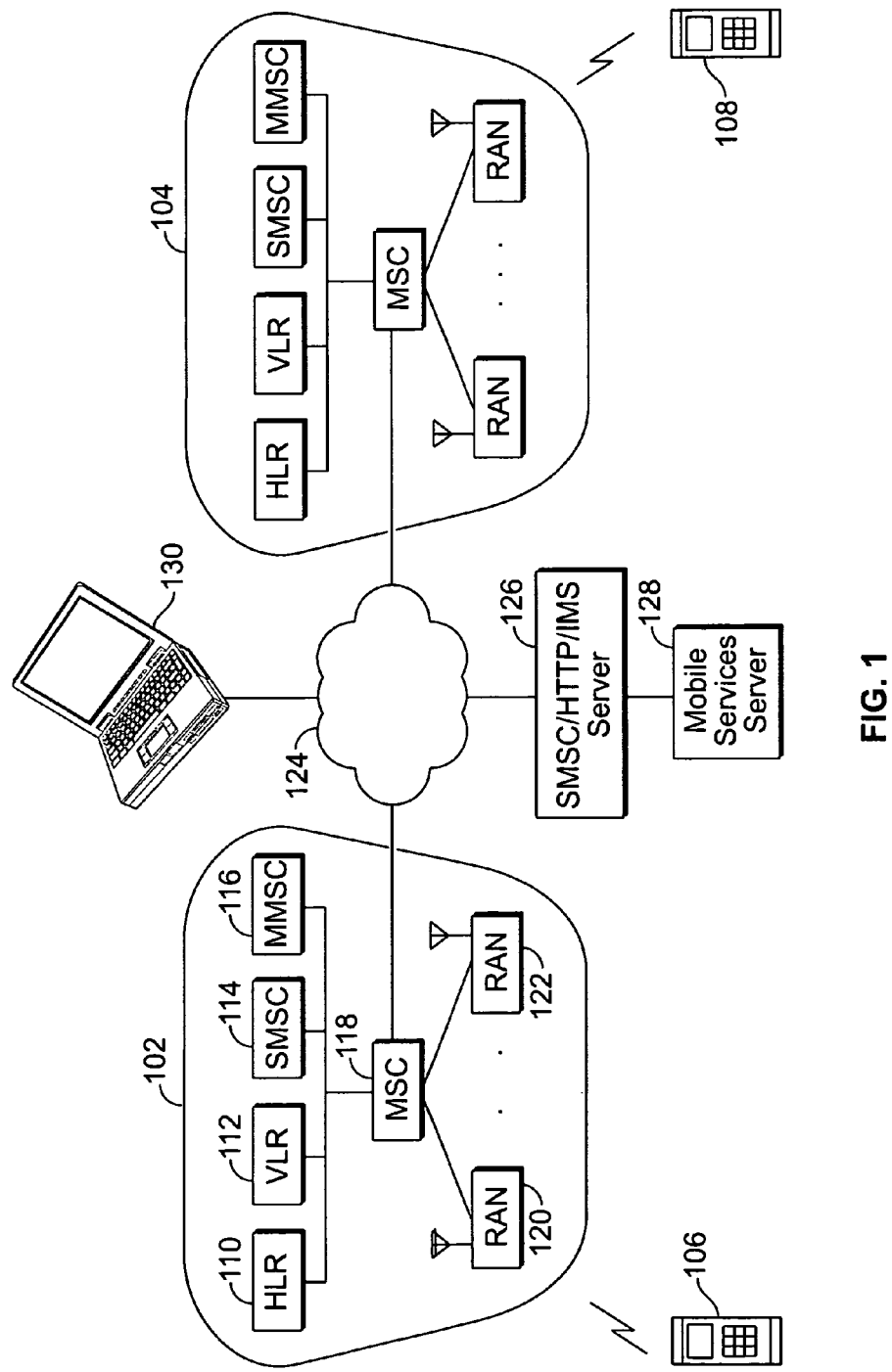
FIG. 1 is a block diagram of an illustrative communication system suited for supporting an embodiment of the present invention.

Referring to FIG. 1, wireless communication systems 102 and 104 support communications with a plurality of wireless mobile devices including exemplary wireless mobile devices (units) 106 and 108, respectively. The communication system 102 includes a home location register (HLR) 110 that serves as an operations and administration center for registered wireless mobile devices and includes information of the current location of the respective mobile devices. A visitor location register (VLR) 112 provides temporary registration and location services for wireless mobile devices located in a communication system that is not the home system for the mobile device. A short messaging service center (SMSC) 114 functions as a server for the transmission and reception of SMS messages for wireless mobile devices supported by communication system 102. A multimedia service center (MMSC) 116 provides a similar function to SMSC 114 for the transmission and reception of multimedia information for wireless mobile devices supported by communication system 102. These nodes/elements perform their known functions as part of the infrastructure that supports wireless mobile communications. A mobile switching center (MSC) 118 provides switching for voice and data communications associated with the supported wireless mobile devices. A plurality of radio access nodes (RANs) 120 and 122 provide a wireless communications link between the system 102 and the supported wireless mobile units. Each RAN is connected to the MSC 118 wherein wireless messages received from a mobile unit by a RAN are transferred to MSC 118 for further routing, and messages to be delivered to a mobile unit are transferred from the MSC 118 to a RAN where such messages are then wirelessly transmitted by the RAN to the destination mobile unit. The elements of communication system 104 are the same as elements in communication system 102 and provide the same functionality for the respective supported mobile units. Hence, the elements of communication system 104 need not be described in detail.

A communication network 124 provides a communication link between the MSCs of systems 102 and 104. Communications with an exemplary SMSC/HTTP/IMS server 126 is also supported by network 124, where HTTP means hypertext transfer protocol and IMS means Internet map server. A mobile services server 128 is supported by server 126 and facilitates enhanced capabilities for wireless mobile units in accordance with an embodiment of the present invention. For example, wireless mobile units may access and download an application program from server 128 that can be installed and operate on the wireless mobile unit to provide enhanced functionality and control of user data in accordance with an embodiment of the present invention. This will be described in greater detail below. Another end user communication device 130, which may comprise a computer or other device, is connected to the communication network 124 by other than a wireless communication link, e.g. a wire internet link through an IP service provider.

Figure 2:
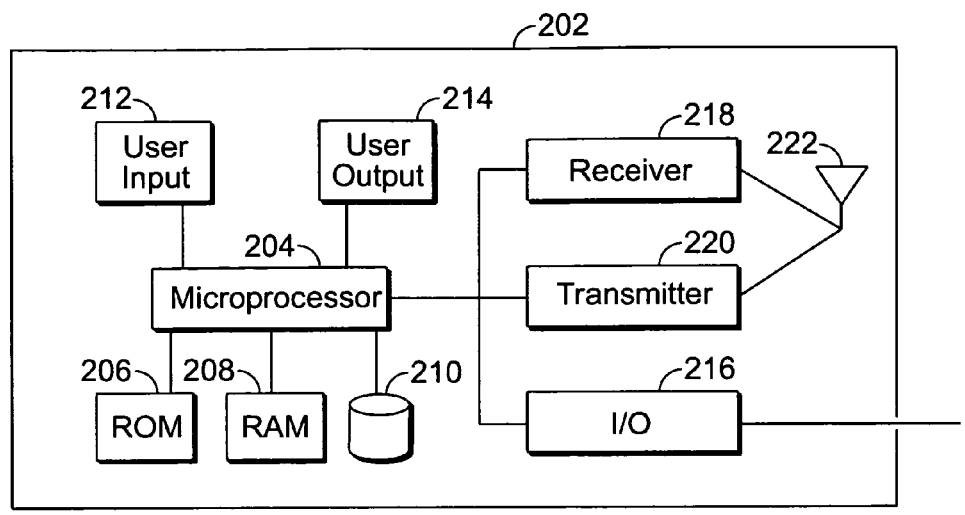
FIG. 2 is a block diagram of an exemplary device in accordance with the present invention.

FIG. 2 shows an exemplary block diagram of a device 202 which can represent mobile services server 128 or an end user wireless or wired device as explained below. A microprocessor 204 performs processes and tasks based on stored program instructions. It is supported by read-only memory (ROM) 206, random access memory (RAM) 208 and nonvolatile data storage device 210. As will be understood by those skilled in the art, data and stored program instructions in ROM 206 is typically utilized by microprocessor 204 to initialize and boot the computing apparatus. An application program, e.g. a program that controls the implementation of one or more functions performed by the device, is stored in storage element 210. At least active portions of the application program will be typically stored in RAM 208 for ready access and processing by microprocessor 204. The application program is specific to the functions to be performed by the device, and performs the functions and steps as described herein. A variety of user inputs 212 such as a keyboard, keypad, touchpad and/or mouse can be utilized to control the operation of the device and the application running on it. User outputs 214, e.g. a display monitor or screen, provide output for the user of the device. An input/output (I/O) module 216 provides a communication interface permitting microprocessor 204 to transmit and receive data with external nodes. The above described elements of device 202 are utilized in a wireless mobile unit, e.g. a cellular telephone, as well as in a server, e.g. mobile services server 128, and a wired connected end user device, e.g. a personal computer.

Where device 202 represents a wireless mobile unit, a radio frequency receiver 218, transmitter 220 and an antenna 222 are also present and used for wireless communications between the unit and supporting RANs. The I/O module 216 supports communications with supporting external peripherals, e.g. USB communications with a peripheral. When device 202 represents a wireless mobile unit, the application program controlling the microprocessor 204 is supported by an operating system and includes an enhanced services (ES) application program such as downloaded from server 128 and installed in the wireless unit. In this case, the user will be the person using the wireless mobile unit. The ES application program provides the wireless mobile unit with functions as explained below.

Where device 202 represents the mobile services server 128 (where elements 218, 220 and 222 are absent), the I/O module 216 supports communications with supporting external nodes, e.g. server 126 or other nodes. In this case, the application program controlling the microprocessor 204 is supported by an operating system and includes a services support (SS) application program which supports the downloading, upon a request from a wireless unit, the ES application program from server 128 to the requesting wireless mobile unit. In this case, the user will be an administrator who maintains the operation of the server. The SS application supports the registration of wireless mobile units, and may also support the storage of user data for use in backup and restore functions with the respective wireless mobile units.

Figure 3:
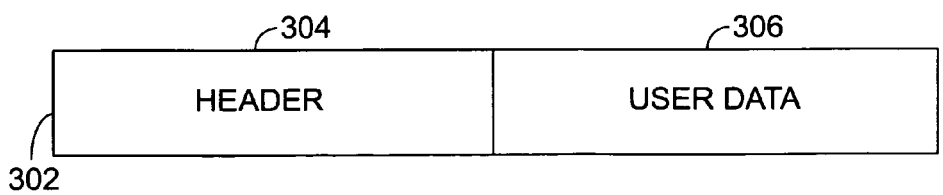
FIG. 3 illustrates a known packet structure for transmitting an SMS message.

FIG. 3 illustrates a known packet 302 used for transmitting SMS messages. Packet 302 includes a header 304 and a user data portion 306. The header 302 contains a number of fields in which data represents information and parameters that are used in the transmission, routing and processing of the packet. The header fields differ depending on whether the packet was originated from a mobile unit or is to be delivered to a mobile unit. Both types of packets include the following header information: the service center address (SCA), the protocol data unit type (PDU) that itself includes a variety of different fields, a protocol identifier (PID) that determines how the SMSC is to process the packet, the digital coding scheme (DCS) identifying the coding scheme within the user data, the user data length (UDL) that specifies the length of the user data. For packets to be delivered to a mobile, the header also contains: the originator address (OA), a service center time stamp (SCTS) identifying the time when the SMSC received the message. For packets originated from a mobile, the header also contains: a message reference (MR) that supplies a successive number that assists with reassembly of a user message that is sent using multiple packets due to its length, a destination address (DA), a validity period (VP) which identifies a time from where the message is no longer valid in the SMSC. The user data portion 306 contains a message of alphanumeric characters input by the user which is the information desired to be communication to another. As is known, the number of characters that can be contained within one user data portion 306 is limited in accordance with the data length limitation of 140 octets associated with signaling system seven (SS 7). Using 7 bit coding, 160 characters can be contained in one user data portion. However, if Unicode coding is utilized, user data portion will accommodate fewer characters as two bytes per character are used.

Figure 4:
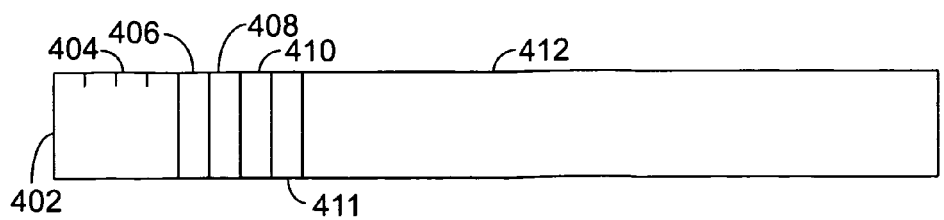
FIG. 4 illustrates a data segment having fields for containing information in accordance with an embodiment of the present invention.

FIG. 4 illustrates a data segment having a sequence of fields containing information in accordance with an embodiment of the present invention. The data segment 402 is coextensive with and resides within a user data segment 306. However, the data segment 402 contains command and control information in addition to a user input message. As will be explained in more detail below, a data segment 402 is processed by the services support application program operating on the originating and terminating wireless mobile unit wherein the command and control information is identified and processed based on predetermined command and control codes stored as part of the services support application program. Because the data segment 402 is totally encapsulated within the user data portion 306, e.g. a user data portion of an SMS message, the data segments 402 are simply treated as conventional user data by the telecommunication infrastructure nodes which pass the encapsulated data segments 402 from an originating wireless mobile unit to a terminating wireless mobile unit. Only the wireless mobile units process the data segments using the services support application program and implement actions corresponding to any command and control information contained within the data segment 402, as well as providing the user with any user message included in a user data segment.

In the exemplary embodiment, field 404 of the data segment 402 consists of four bytes which identify one of a plurality of message types in accordance with predetermined message types stored in the SS application program. In this example, field 404 contains the label "//P:" wherein the characters // and : form part of the label, and the "P" identifies a specific type of message, i.e. a Peanut message type. In this exemplary embodiment, a Peanut message type identifies the message as being a person-to-person communication. Different characters in place of the "P" in this field can be used to identify other message types where each message type is associated with different subject matter, e.g. email, banking, insurance, coupons, games, health care, etc. Field 406 consists of one byte identifying the format or coding structure. In this example, field 406 may have valid values of 0, 1 or 2 wherein 1 indicates a control message, 0 indicates a normal user message utilizing 7 bit coding, and 2 indicates a normal user message utilizing the Unicode format. Field 408 consists of one byte having a value where this value identifies the priority of the associated message assigned by the message originator that is intended to alert the recipient of the intended priority, e.g. urgency, of acting on and/or responding to the message. As will be explained, this value may also control additional aspects, e.g. encryption/decryption. Field 410 consists of one byte, i.e. a command byte, identifying the length of message parameter values and may have valid values of 0-128. The value of field 410 specifies the number of sequential bytes that are part of a control portion of the data segment, i.e. bytes before the user input data begins. Field 411 consists of a number of bytes equal to the value in field 410, e.g. 0-128, and contains name value pairs as will explained in the below examples. Field 412 contains the user input information desired to be conveyed to another party. If the length of the user input information exceeds the number of bytes available in field 412 of one data segment, the user input information can be parsed and transmitted as multiple fragments sent in a series of SMS packets containing corresponding data segments 402 with the parsed user information.

FIG. 5 is a table where each row represents an example of bytes in different data segments 402. The top row of FIG. 5 contains labels of the first 20 bytes showing the respective byte positions 0-19. A first example, Ex1, shows an exemplary control message that will be interpreted by the ES application program operating on the destination wireless mobile unit to deactivate the ES application program on the subject mobile unit. The command may be sent from the SS application program running on the server as the result of termination of registration on the subject user or as a request of the owner of the subject mobile unit since the subject handset is currently lost or stolen. Deactivation of the ES application program will prevent the ES application program from operating on the subject mobile handset, which in turn prevents usage of features and/or user data only accessible through the ES application program. Bytes 0-3, which correspond to "//P:" define the data segment 402 as being a Peanut application. The 1 value in byte 4 defines the data segment as being a control message, the 0 value in byte 6 indicates that no length of message parameter values is specified, and the 0 in byte 5 is merely a place holder in the byte sequence since there is no user message and hence no corresponding message priority to specify. Where no user message exists, the value of byte 5 is not relevant, i.e. a "don't care value". The character string "DEACTIVATE" residing in bytes 7-16 will be interpreted by the ES application program on the recipient mobile unit as a predefined command to prohibit further operation of the ES application program on the subject mobile unit.

Example 2 of FIG. 5 is a data segment similar to example 1 in that it contains a "WIPEOUT" command that will be interpreted by the ES application program on the recipient wireless mobile unit as a request to completely wipe out user data stored through the Peanut application operating under the ES application program. That is, all messages, contacts, templates and other user data stored by the Peanut application will be deleted. These first and second examples are intended to be merely representative of a variety of commands that can be utilized, e.g. "ACTIVATE" to activate a Peanut application, "CHANGEPIN <xxxx>" to permit the changing of a personal invitation number or password to the value xxxx contained in the control message, etc.

Example 3 of FIG. 5 illustrates a different type of Peanut application data segment in which the 0 value in byte 4 indicates that the data segment is a normal message type. The 0 value in byte 6 indicates that no message parameter values are specified. The value 4 in byte 5 is used to convey the priority selected by the message originator in accord with FIG. 11. This message will be displayed on the screen of the recipient's communication device with a gray background, that is, the message of alphanumeric characters is displayed on a segment of the recipient's screen in which the background color of the segment is gray. The gray background color is intended to convey to the recipient that this is a normal communication and that a response is not expected by the originator. A predefined group of background colors with corresponding message priorities is made known to all end-users so that the originator of a message can specify a corresponding message priority that will be conveyed in accordance with the present invention to the recipient. The display of different background colors for the alphanumeric characters of the message is intended as exemplary of a variety of visual indicia that could be displayed on the screen of the destination device to denote message priorities. For example, the color of the alphanumeric characters themselves, the color of a portion of the screen segment displaying a message, the color of a separate field or distinctive symbol displayed adjacent the message text/field, type or style of the alphanumeric characters, shading associated with the alphanumeric characters and/or background, or other visually distinctive appearances with corresponding priority definitions can be utilized to convey different priorities for a message. It is preferred that the priority indicia always be included when the corresponding message is displayed, e.g. it will be displayed with saved messages, messages restored from backup storage, messages transferred to another user device, messages as displayed on the originating device, etc. Also, a larger number of types of priorities can be used to convey finer distinctions of originator expectations, e.g. orange color="urgent, confirm message receipt as soon as possible"; purple color="normal message priority, reply within X hours/days", etc. As among a group of users, the group members are free to agree that the available suggested priority categories (colors) will have an understood meaning that differs from the standard suggested meaning. The Peanut application on the receiving wireless mobile unit will interpret this data segment as carrying a message, "HELLO FM MIKE", to be displayed to the user against a gray color background indicating a normal communication to which the originator does not expect a reply communication.

Example 4 of FIG. 5 carries the same message to be conveyed to the user as in example 3. Again, the 0 value in byte 4 indicates that the data segment is a normal message type. However, the 4 value in byte 6 indicates that 4 bytes starting at byte location 7 carry control information that precedes the user message. In this example, bytes 7-10 contain "E006", where the E in byte 7, i.e. a command identification character, indicates that an expiration of the subject message is to be executed (message is to be automatically deleted), 0 in byte 8 indicates expiration in zero days, 0 in byte 9 indicates expiration in zero hours, and the 6 in byte 10 indicates expiration in six minutes. That is, upon the receipt of this data segment by the Peanut application on the destination wireless mobile unit, the subject message, ""HELLO FM MIKE", will be conveyed to the user, but all instances of this message will be automatically deleted from recipient mobile unit on the expiration of six minutes. The value 4 in byte 5 indicates the message will be displayed with a gray background conveying a normal communication in which a reply communication by the recipient is not expected.

Example 5 shows an illustrative Peanut application data segment which is similar to example 4 in that the value in byte 6 is not zero indicating that a command in addition to the user messages contained in the data segment. In this example, the 7 in byte 6 indicates that seven bytes starting with byte 7 are associated with command information and precede the beginning of the user data to be conveyed. The L in byte 7 will be interpreted as signifying that the subject data segment is a long message, i.e. the subject user message has too many characters to be contained in only one data segment, thereby requiring fragmentation of the user message into a plurality of message fragments that will be transmitted in a number of data segments. The four bytes, bytes 8-11, collectively comprise a value used to identify each of the required data segments needed to complete the long message. In this example, this value is "0001". The next byte, byte 12, represents the total number of data segments required to complete the long message. In this example, byte 12 has a value of 2 indicating that two data segments are required to complete the single long message. Byte 13 represents the current fragment number of the subject data segment. In this example, byte 13 has a value of 1 indicating that this is the first data segment fragment of the long message in the long message fragments identified as "0001". The first character of the actual user message is in byte 14 with the remaining bytes in the subject data segment carrying further portions of a first message fragment. Example 6 shows the second and last message fragment that completes the long message identified by "0001". Byte 13 of example 6 contains a value of 2 indicating that it is the second in a message fragment series. It is also the last of the message fragment series since byte 12 indicates that the long message is contained in two message fragments. Byte 14 in example 6 contains the first character of user data in this data segment, but corresponds to the next character in the long user message that follows the last character of the user message contained in the preceding data segment represented by example 5. The value 3 in byte 5 in examples 5 and 6 causes the message characters to be displayed against a green screen background on the recipient's device which is intended to convey a normal communication in which a response is expected by the originator.

Example 7 illustrates a data segment that contains two commands. The value 12 in byte 6 indicates that 12 bytes starting with byte 7 are associated with commands. As explained in example 4, the values "E005" in bytes 7-10 indicate a message expiration upon five minutes from the receipt by the Peanut application. The value 255 in byte 11 serves as a predetermined separation character used to separate commands. Similar to example 6, the L in byte 12, which is the first field/character at the beginning of a command string, identifies this data segment as a long message. The bytes 13-16 serve to identify the fragments in series of data segments. Byte 17 has a value of 2 indicating that there are a total of two fragments in the long message series and byte 18 with a value of 1 indicates that this is the first fragment in the series. The first portion of the actual user message follows beginning at byte 19.

Example 8 represents the second fragment of the long message where the first fragment was described in example 7. It will be noted that this data segment contains only a single command associated with the long message fragmentation. That is, the time expiration contained as a first command in the first message fragment is not repeated. In accordance with an embodiment of the present invention, a time expiration command communicated in a first message fragment will automatically be effective for all succeeding fragments of the same long message. Thus, the entirety of the perceived long message will be subject to the time expiration. In this example, the value 7 in byte 5 indicates a command string of seven characters in which: L in byte 7 identifies this segment as a long message type, "0002" in bytes 8-11 identifies the long message fragment series, 2 in byte 12 indicates that the long message consists of two message segments, and the 2 in byte 13 indicates that this is the second fragment in the series of the identified long message, and since there are only two message fragments in this long message, the 2 in byte 13 also indicates that this is the last received fragment in the series. The remaining portion of the user message begins with byte 14 and continues to the conclusion of the user message is contained in this message fragment. The value 1 in byte 5 in examples 7 and 8 will cause the message characters to be displayed on the recipient's screen segment against a red background which is intended by the originator to convey an emergency message requiring immediate attention.

When a message sent from an originator's device using a native message client is received and processed by the destination device using the Peanut ES application, the message is displayed on the destination device's screen with a white background, denoting that this message was received as a public unsecured communication. Previously received messages are stored by the respective ES applications and always displayed with the corresponding background color of its associated priority as determined by byte 5 of the respective message. Preferably, messages being composed and stored by an ES application on an origination device are also displayed on the screen of the origination device by the ES application with the background color selected by the user for the priority of the respective message.

In the above examples of FIG. 5, all of the characters in the various byte positions are shown in a clear text format. In order to preserve security during the transmission of such messages, it is preferred that the majority of each message be sent in an encrypted format. For example, all bytes after byte 3 will preferably be transmitted utilizing a form of encryption. Those skilled in the art will understand that the use of such encryption requires that the receiving wireless mobile device be capable of decrypting the received encrypted characters thus transforming each received message into a corresponding clear text format as illustrated in accordance with FIG. 5.

Figure 6:
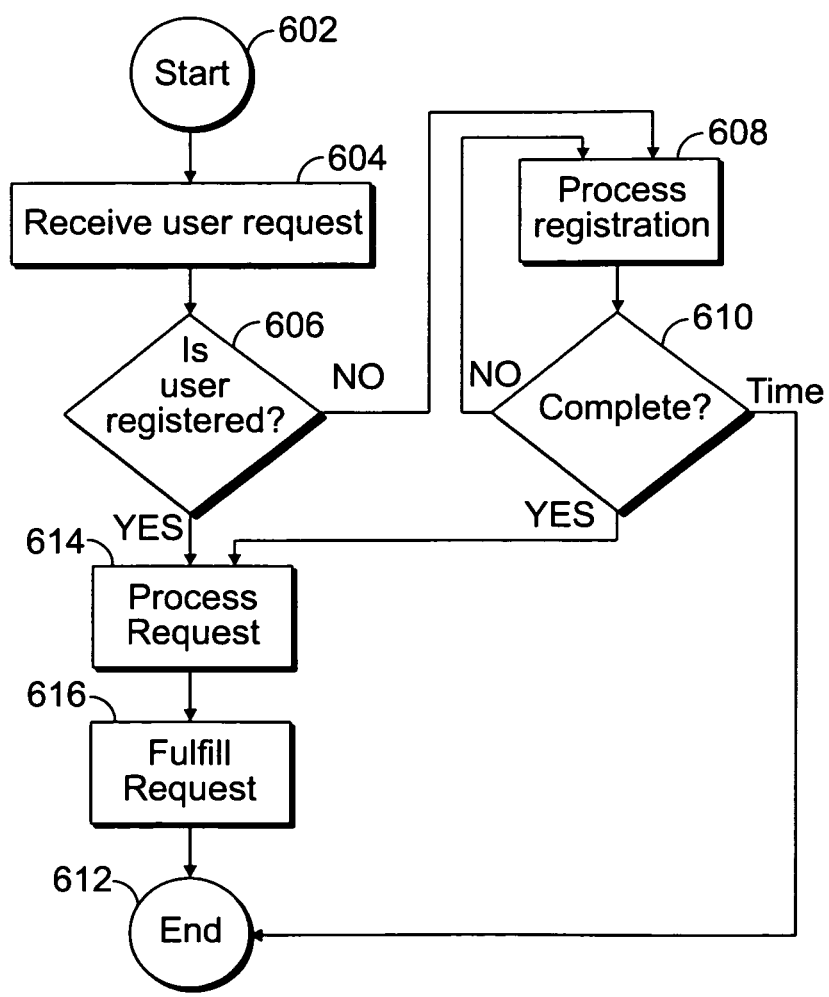
FIG. 6 is a flow diagram illustrating the operation of the mobile services server in accordance with an embodiment of the present invention.

FIG. 6 is an illustrative flow diagram of the operation of the mobile services server in accordance with an embodiment of the present invention. The illustrated process begins with START 602. In step 604 the server receives a user request in the form of a message such as including a command in the format as illustrated in FIG. 5. Upon receiving the user request, a determination is made in step 606 of whether the user is registered. This step may include the services server querying a database storing a list of registered users to determine if the requesting user is registered. A NO determination by step 606, indicating that the requesting user is not registered, results in step 608 beginning a registration process of the subject user. The process may include the transmission of messages between the server and the user's wireless mobile unit by which the server ascertains sufficient information to register the user. In step 610 a determination is made of whether the registration process is complete. A NO determination by step 610 results in further processing by step 608. Should the registration process not be completed within a predetermined time period, step 610 will time out resulting in the termination of the process and the request has indicated at END 612.

A YES determination by step 606 or a YES determination by step 610 results in the user request being processed as indicated by step 614. Processing of the request may include parsing the received request to determine included commands and/or user message components. Such processing is substantially the same as described later with regard to processing of received messages by wireless mobile unit. In step 616, the request is fulfilled. The fulfilling or action taken in response to the request will vary depending upon the nature of the request itself. The action taken may be applicable to the wireless mobile unit that originated the request or to a different wireless mobile unit. For example, a BACKUP request will cause the uploading and storage of user data contained on the requesting mobile unit to the services server. A RESTORE request will cause the stored user data previously obtained during a BACKUP request to be downloaded and installed on the requesting local unit from the services server. However, other commands may initiate actions to be taken at a wireless mobile unit that is not the requesting mobile unit. For example, a DEACTIVATE request received by the services server from a first mobile unit will cause another wireless mobile unit, having an address specified in the request, to be deactivated. Such a request requires user authentication to ensure that the user making the request is the registered owner of the device to which the deactivation request is directed. The process terminates at END 612.

Figure 7:
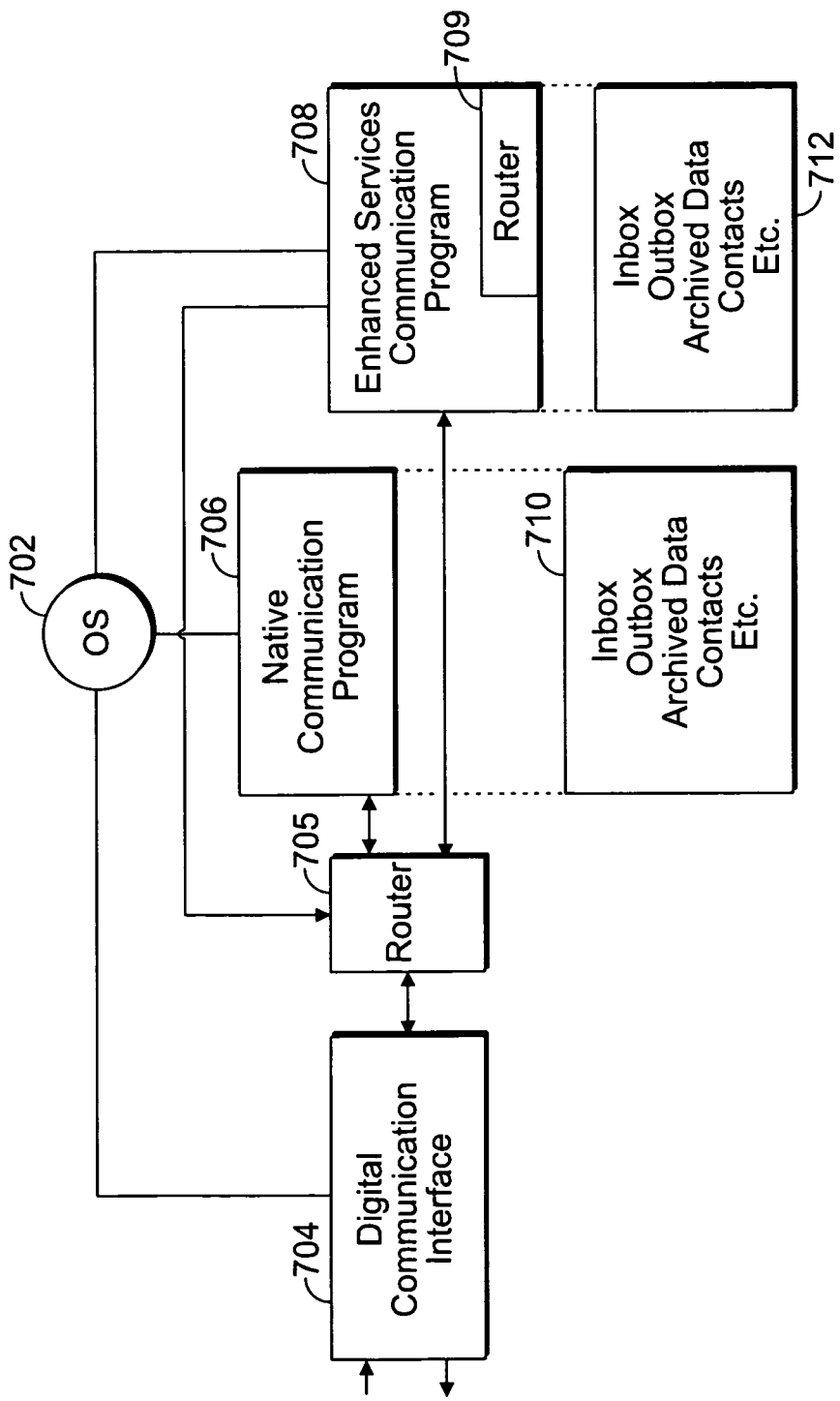
FIG. 7 is a representation of the relationship of application programs operating on a wireless mobile unit that provides enhanced services in accordance with an embodiment of the present invention.

FIG. 7 shows the relationship of programs operating on a wireless mobile unit that provides enhanced services in accordance with an embodiment of the present invention. This shows an overview of the general relationship between the operating system (OS) 702, the digital communication interface 704, router 705, a native communication program 706 and the enhanced services communication program 708. As known to those skilled in the art, a number of different operating systems support the operation of various programs and applications on different wireless mobile units, e.g. Symbian, Android, Apple's iOS, Research In Motion's BlackBerry OS, Microsoft's Windows Phone, etc. The digital communication interface 704 recognizes the transport layer communication protocol, e.g. SMS, MMS, email, etc., used to convey the received information and converts the information provided from the wireless receiver into a digital character string for processing by the native communication program 706 or the enhanced services communication program 708. The digital communication interface 704 also converts a digital character string received from program 706 or 708 into information in the specified transport layer communication protocol provided to the wireless transmitter. Router 705 controls whether the digital communication interface communicates with the native communication program 706, the ES communications program 708, or both based on instructions received from the ES communication program. For example, the user can select via the ES communication program to have all incoming messages sent for processing by both the native communication program 706 and the ES communications program 708. Alternatively, the user can select via the ES communication program to have all incoming messages sent for processing only to the ES communications program 708, which is capable of processing messages received with native formatting or ES application formatting. Choosing the latter is advantageous since the ES application is capable of additional services, e.g. received messages of all formats can be conveniently backed up and later retrieved/restored into the same user device or another device of the user via these features of the ES application.

Native communication program 706 supports a plurality of files and/or records 710, e.g. inbox, outbox, archived data, contacts, etc. The native communication program refers to the communication program originally supplied by the manufacturer or service provider upon the initial acquisition of a wireless mobile unit by a user. The enhanced services communication program 708 is an application program that is typically installed by the user such as by downloading it from the services server or otherwise installing it from an external source. The enhanced services communication program 708 also supports a plurality of files and/or records 712, e.g. inbox, outbox, archived data, contacts, etc. In accordance with an embodiment of the present invention, the user must obtain access to the enhanced services communication program in order to access its supported files and records. Access may be, for example, obtained by entering a user identification and corresponding password in response to user prompts displayed on the screen by the enhanced services communication program upon request to open this program. Interactions between the enhanced services communication program and the native communication program is supported by an application program interface (API) associated with the native communication program and/or supported by the operating system itself.

In the illustrated example, the digital communication interface 704 transmits and receives digital communication strings with both the native communication program 706 and the enhanced services communication program 708. Since communications originated from a wireless mobile unit utilizing the enhanced services communication program is encrypted, the receipt of such an encrypted communication by a destination mobile device will be unintelligible as viewed from a native communication program of the destination mobile device. However, the message may be viewed in clear text format by utilizing the enhanced services communication program on the destination mobile device. For example, a received SMS text message that was transmitted from an enhanced services communication program on the origination mobile device, will appear as a string of unintelligible characters when viewed by the native communication program of a recipient device, except for the leading format indicator "//P:". The same message will be displayed in a clear text format in the inbox of enhanced services communication program (Peanut) on the recipient device.

The enhanced services communication program 708 may include a plurality of modules or sub-programs that support different types of enhanced services, e.g. Peanut "//P:" for messaging, Walnut "//W:" for email, Hazelnut "//H:" for banking, Brazilnut "//B:" for insurance, Chestnut "//C:" for games, Pistachio "//PH:" for healthcare, The Nest "//TN:" for coupons, etc. In support of multiple types of ES, the enhanced services communication program 708 also contains a router module 709 which determines the type of received communication based on the identifying format, i.e. the "//X:" designation, and routes the communication to the corresponding module for processing. This routing is independent of the transport layer communication protocol that was used to convey the incoming communication to the destination communication device.

For example, an incoming SMS message from the user's automobile insurance agent may contain a notice of the date on which the term of the current insurance policy will be expiring and a reminder to pay the premium to keep the policy in effect. This SMS message will have been transmitted from a device using ES originated by the Brazilnut module "//B:" format since the subject matter of the communication deals with insurance. The router module 709 in the recipient's communication device will recognize this ES format and route the corresponding communication to the Brazilnut module for processing. An ES email communication concerning insurance, sent from an originator device using the Brazilnut module, could have been used to convey the same message wherein the router module 709 in the recipient's communication device would route the email communication with a "//B:" format to the Brazilnut module for processing.

Each ES module supports a unique ES format to identify itself and contains its own segregated set of user utilities, i.e. inbox, outbox, etc. That is, each ES module may require a separate user identification and password in order to access the corresponding user utilities, and will have different encryption/decryption requirements than other ES modules. As explained above, encryption is used for ES communications except for the ES format identification. To properly decrypt a received communication into clear text, the incoming communication must be processed by the ES module in the destination user's device that corresponds to the ES module used to originate the communication since each ES module uses a different form of encryption. For example, an incoming Brazilnut communication received by the intended destination device and processed by its Brazilnut module will be decrypted into a clear text message. However, an incoming Brazilnut communication received by the intended destination device if processed by an ES module other than the Brazilnut module would not be properly decrypted into a clear text message since the decryption process would not match the encryption process. Thus, ES communications, even if processed by the intended destination device, will appear as a character string that is not intelligible if processed by the native communication program of the device or by an ES module of a different format. An ES communication if received or intercepted by an unintended destination device will appear as an unintelligible character string since the encryption/decryption process is also unique to the originator/recipient, i.e. the encryption/decryption key includes parameters associated with specific devices/users. Hence, the embodiment of the present invention provides identity management as well as subject matter organization and management.

Figure 8:
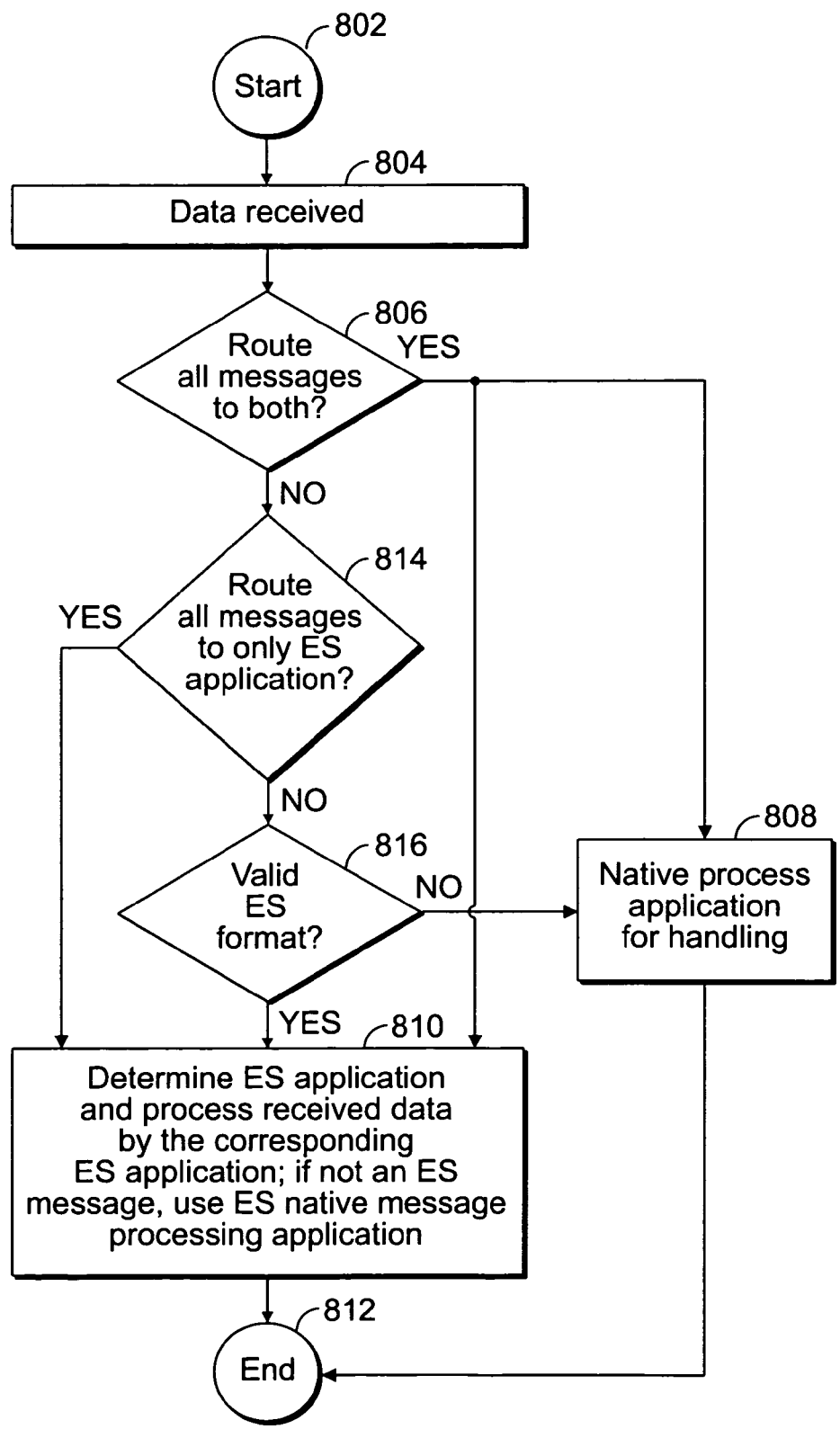
FIG. 8 is a flow diagram of a method practiced by a wireless mobile unit that provides enhanced services in accordance with an embodiment of the present invention.

FIG. 8 shows steps of a method practiced by a wireless mobile unit that provides enhanced services in accordance with an embodiment of the present invention. This process begins at START 802. In step 804 incoming data originated from another wireless mobile unit is received at the subject destination wireless mobile unit. The ES application provides a user selectable input by which the user chooses how received messages are to be processed. That is, the user can select whether to have all messages routed to both ES application and the native application or have all messages routed only to the ES application for processing. This user input selection is stored in memory as part of the ES application in the corresponding communication device and controls how received messages are routed in accordance with the control provided by the ES communication program 708 to the router 705.

A determination is made in step 406 of whether all received messages are to be routed to both the native processing application and the ES application. A YES determination by step 806 causes the received message to be transmitted for processing to both the native processing application 808 and to the ES application 810. A NO determination by step 806, indicating that the user has not selected that all incoming messages be processed by both applications, results in step 814 making a determination of whether the user has selected all incoming messages to be processed only by the ES application. A YES determination by step 814 results and all incoming messages being processed by the ES application at step 810. A NO determination by step 814 results in step 816 making a determination if a valid ES format is present in the received message. For example, a valid ES format can be determined to have been received in a message if the first 4 bytes consist of "//X:" where the X corresponds to one of the valid modules in the ES application. A NO determination by step 816 results in the message being transferred to the native process application for handling as indicated at step 808. A YES determination by step 816, indicating that a valid ES format is present in the received message, results in the message being processed by an ES application at step 810. In step 810, the ES module to be utilized to process the received message is determined based on the "X" as explained above. If a message is received by step 810 for processing that does not contain a valid ES module identification, the ES application will still process the message as a native message in a manner similar to the native process application. However, the native processing provided by the ES application differs from the processing provided by the native application in that the ES application places the resulting message in an inbox of a predetermined default ES module, e.g. the message is displayed to a user in the secure inbox of the Peanut application. An advantage of having the ES application process all of the received messages is that all of the supported ES features, e.g. security, backup, retrieval, restore, etc., is made available for all received messages, even messages that were originated from a user device with native processing. It also permits the user to easily transfer all of the saved messages stored on one handset to another handset, even where the other handset is made by a different manufacturer and/or utilizes a different operating system. Since all received messages are stored only in secure inboxes of the ES application, all received messages are protected by the security provided by the ES application.

Figure 9:
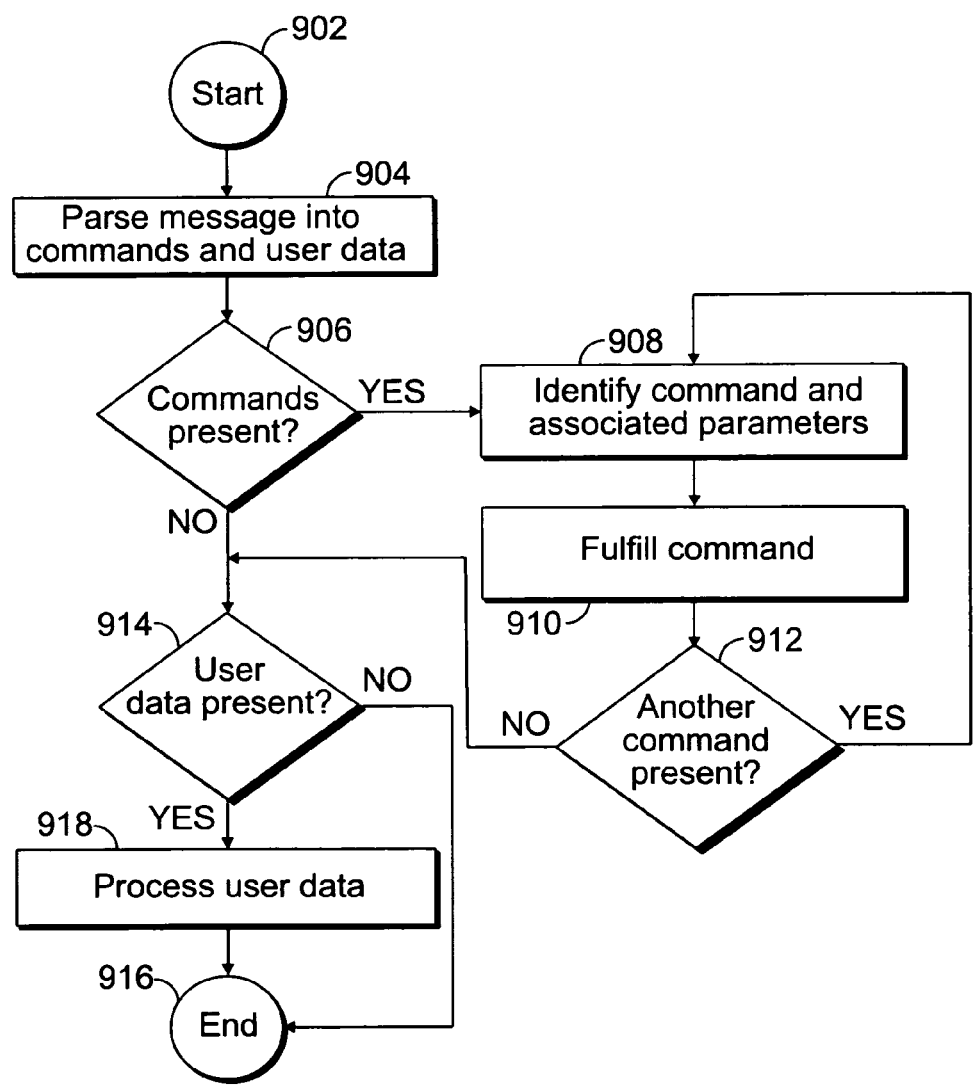
FIG. 9 is a flow diagram of steps utilized by a wireless mobile unit to process a received message in accordance with an embodiment of the present invention.

FIG. 9 shows a flow diagram of steps utilized by a wireless mobile unit to process a received enhanced services message in accordance with an embodiment of the present invention. Beginning with START 902, the received message is parsed into commands and user data in step 904. As explained with regard to FIG. 5, the values contained in bytes 4 and 5 can be used to separate the received message into commands and user data. The message may consist of only commands, only user data, or commands and user data. In step 906 a determination is made of whether commands are present. A YES determination by step 906 results in step 908 identifying a first command and its associated parameters. The type of command is identified by comparing the received command characters with a table of predetermined commands stored in the wireless mobile unit as part of the enhanced services application program. This table also contains a stored list of predetermined parameters associated with the command, where the value of receipt parameters determines the extent or range of an associated action associated with the command. In step 910 the identified command is fulfilled, i.e. depending on the type of command, the command may be immediately executed or scheduled to be executed upon the occurrence of an event or scheduled for execution at a later time. For example on the receipt of a message having an automatic expiration command and its associated time interval, deletion of all instances of the clear text received message from the recipient's device becomes a scheduled task to occur at the time interval set by the originator of the message. The time interval may be started upon the message being read by the recipient, e.g. sensing the first display of the corresponding clear text message on the user's screen. The deletion event may be determined by a timer set to the expiration time interval or by setting a task to periodically compare a date/time set by the originator to a running clock on the user's device. At the deletion event, automatic deletion of the associated clear text message(s) is executed, including every instance/copy of this clear text message. That is, if the message to be deleted appears in the Inbox and in other records, e.g. Saved Message record, etc., all copies will be deleted. In step 912 a determination is made of whether another command is present in the received message. A YES determination by step 912 results of processing continuing with step 908.

A NO determination by step 906 or a NO determination by step 912 results in step 914 making a determination of whether user data is present in the subject received message. A NO determination by step 914, indicating that no user data is present to be processed, results in the conclusion of processing at END 916. A YES determination by step 914 results in step 918 processing the user data contained in the received message. Typically, in the case of an SMS text message, processing user data includes providing an alert to the user indicating that a message has been received, displaying the received message on the screen of the user's wireless mobile unit along with visual indicia indicating the priority assigned by the originator, and storing the received message as a file or record, e.g. a record in the INBOX of the enhanced services application program. Assuming the message was transmitted as an encrypted format, the message will be decrypted, displayed on the screen with corresponding visual indicia, and stored in the INBOX as a clear text message by the enhanced services application program. The processing that concludes at END 916.

With regard to the automatic expiration feature as implemented by the ES application, a user may execute an EXPORT or BACKUP of an entire INBOX which may contain a message that was subject to an automatic expiration command. Messages contained in the INBOX will be copied to an external file or remote messaging server in the same format in which the message was received. That is, messages will be copied in encrypted format and any commands associated with a message will be maintained as well as time stamps being preserved. As part of an IMPORT of an EXPORTED file, or a RESTORE of a BACKUP file by the ES application, commands originally associated with a message being retrieved will be checked as part of the retrieval process. If an automatic expiration command is found associated with a message attempted to be retrieved, and the time interval associated with the expiration command has lapsed, the message will be deleted as part of the retrieval process and will not be copied to user's device or displayed to the user. Likewise, an ES version of a server that stores the EXPORTED or BACKUP file will also automatically delete any copies of messages that have expired similar to the explained method used by an end-user's device. This is consistent with the message behavior as requested by the originator.

Governmental authorities may have legal authorization to intercept and/or monitor communications with an individual. The ES application is compliant with the ability of authorities to obtain copies of messages being transmitted through a telecommunication network to or from a certain individual. However, messages are transmitted from the originator's communication device in cipher-text format and remain in that format as the message is transmitted through the nodes in the telecommunication network until the message is delivered to the recipient's device in which the ES application decrypts the cipher-text message into a clear text format. Thus, governmental authorities will have access to the cipher-text messages but will need assistance from the originator (whose device maintains a clear text version of the message) or the recipient (whose device is able to decrypt the cipher-text version into a clear text format) in order to obtain the corresponding clear text messages. In accordance with the ES application, the recipient's device will delete the clear text version of a message upon entry of a manual delete command or upon deletion by the automatic expiration feature. However, the cipher-text (encrypted) version of each received message is maintained in a log file in the recipient's device even if the clear text version of the same message has been deleted. Review of an end-user's log file will enable legal authorities to confirm that the user's device received a specific message at an indicated date/time.

An alternative version of the automatic expiration command may be based on a certain date/time or time expiration being reached regardless of whether the recipient has read, e.g. opened/displayed, the corresponding message. For example, a business that wishes to advise potential customers of a promotion for a product or service where the promotion expires on a certain date/time may utilize the automatic expiration command for messages associated with the promotion so that such messages are automatically deleted following the end of the promotion. A user may receive such a message but elect not to read/open the message for various reasons. Upon this alternative automatic expiration time being reached, such a message will be deleted from the recipient's device even if the recipient has not opened or read the corresponding message. This is similar to the above described method except that the deletion event is started upon receipt of the automatic expiration command and monitors the expiration date/time relative to the current date/time as kept by the end-user's device. Similarly, if such a message is being held on an ES server awaiting delivery to a recipient and the time interval/date associated with the alternative automatic expiration command expires, the ES server will delete the message and no further attempted delivery to the recipient will be made.

"Forward Restriction" and "Backup Restriction" commands are available to be set by the originator of the message utilizing the ES application. As the name implies, employing a restriction command associated with a transmitted message will cause, on delivery of the message to the recipient's device, a restriction that prevents the recipient from forwarding or backing up the associated message. This feature may be utilized in combination with the automatic expiration feature to prevent a received message from being forwarded or backed up during the time prior to the automatic deletion of the clear text message. Alternatively, this command may be utilized independent of the automatic expiration feature. Upon a request by a recipient of a message to implement a Forward or Backup by the ES application, the respective Forward and Backup features will first check the received commands associated with the respective message(s) to determine if a restriction command is present. If a restriction command is present, the corresponding Forward and/or Backup features will prohibit the respective forwarding and/or backing up of such messages. Features such as "save to file", "copy", "archive", and/or "printout", that are made available to the user as choices for actions to be taken for received messages, are preferably inhibited if a restriction command is associated with a message for which such an action is selected by the user. Inhibiting these features for received messages with a restriction command is consistent with the intent of the message originator to limit dissemination of the message. Such restrictions are implemented by requiring the respective features to perform a check to determine if the corresponding message which is the object of the action includes a restriction command. Such a determination is made as a condition precedent to execution of the respective action, i.e. a restriction command being found in the object message will inhibit execution of the feature, and may optionally cause a screen pop up notice to the user advising that such action is not allowed for restricted messages.

Figure 10:
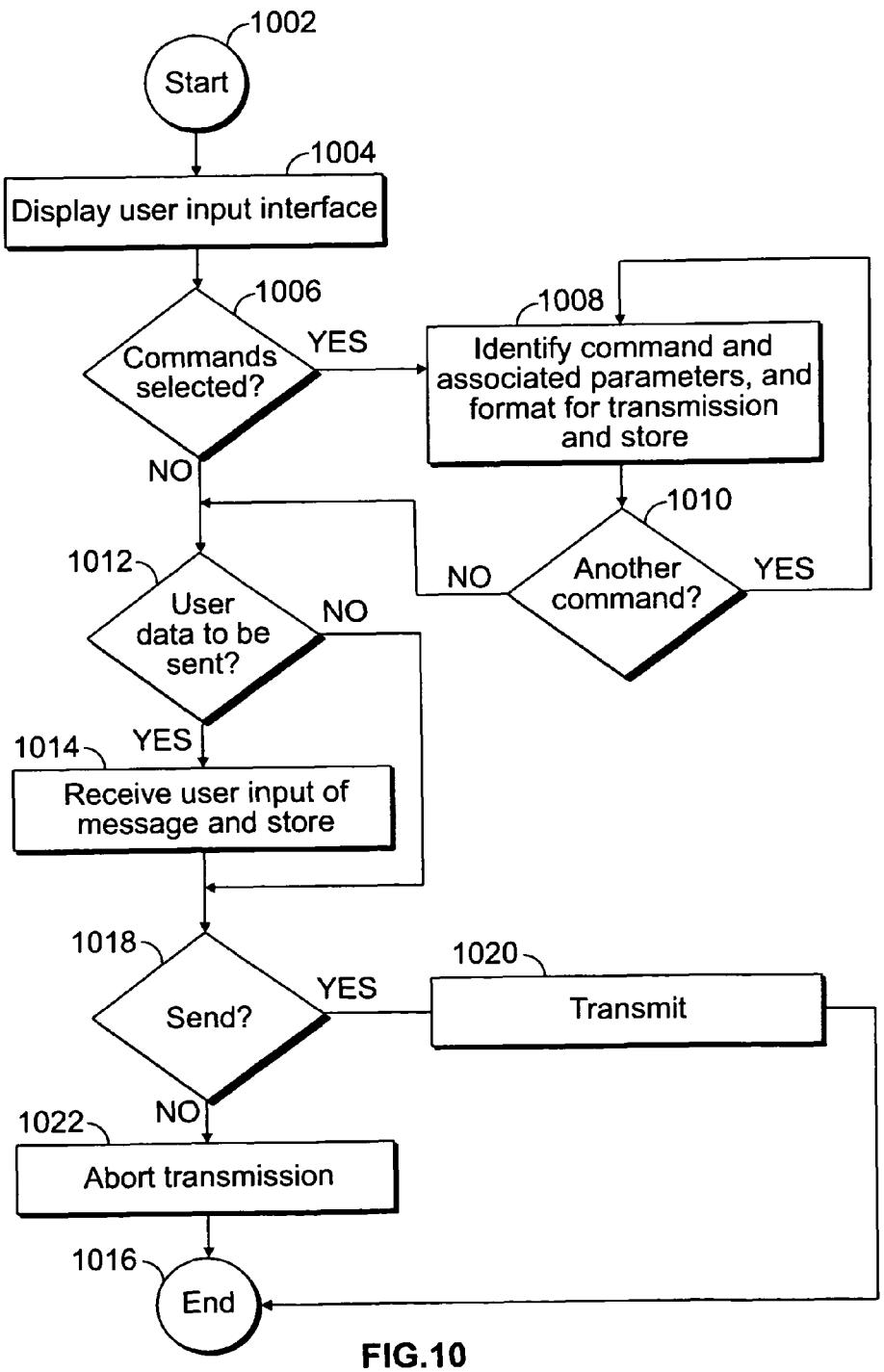
FIG. 10 is a flow diagram of steps utilized by wireless mobile unit associated with the transmission of a message in accordance with an embodiment of the present invention.

FIG. 10 shows a flow diagram of steps utilized by wireless mobile unit associated with the transmission of a message by an ES module of the enhanced services application program in accordance with an embodiment of the present invention. Beginning with START 1002, a user input interface is displayed on the screen of the user's wireless mobile unit for the ES module selected by the user at step 1004. This input interface may consist of graphical user interface with one or more menus each containing a list of items or commands for selection by the user. Alternatively the user may be presented with a blank field in which alphanumeric characters can be entered by the user. Part of the input interface may include the selection of an existing contact or entry of the address of the wireless mobile unit to receive the message being composed. In step 1006 determination is made of whether commands have been selected by the user to be included in the message to be transmitted to another user. A YES determination by step 1006 results in step 1008 identifying the command and its associated parameters to be included in the message, and storing the command in an appropriate format for later transmission. As part of the enhanced services application program, each of the user selectable commands as provided by user input interface is linked to a corresponding command by a table or records stored in the wireless mobile unit as part of the enhanced services application program. As explained with regard to FIG. 5, a first command and its parameters are formatted to occupy a series of bytes beginning with byte 7. In step 1010 determination is made of whether another command is selected by the user to be included in the same message. A YES determination by step 1010 results in step 1008 processing further selected command. Example 7 in FIG. 5 illustrates a second command included in the same message. Formatting of further commands includes inserting a separation character "255" at the byte following a previous command followed by the insertion of the command characters and its parameters. After the insertion of all commands to be transmitted in a single message, the values in byte positions 4 and 6 are determined and inserted as previously explained with regard to FIG. 5.

A NO determination by step 1010 or by step 1006 results in step 1012 making a further determination of whether user data is to be sent as part of the message being composed by the user. A YES determination by step 1012, indicating that user data is to be included, results in step 1014 receiving the user input of the data to be included in the message and storing the user data beginning at the byte position following the last byte of the last command. User input data can be input utilizing a graphical user interface such as from menu selection or by accepting alphanumeric characters entered the user in a predetermined data entry field; see FIGS. 12-14. For each message, the originating user can select a priority, such as one of the exemplary priorities shown in FIG. 11, that will be assigned to the message. Messages are transmitted with a default priority, e.g. "GRAY", if the originating user does not set a different priority before the message is completed. This is explained in more detail with regard to FIGS. 12-14. Following step 1014 or upon a NO determination by step 1012, indicating that no user data is to be included, a determination is made in step 1018 of whether the completed message should be sent. A YES determination by step 1018 results in the composed message being transmitted from the utilized ES module to the destination wireless mobile unit by step 1020. As part of the transmission process, the transmitted message may be stored in the OUTBOX of the corresponding ES module in the originating wireless mobile unit. The process concludes at END 1060. A NO determination by step 1018, indicating that the composed message is not to be transmitted, results in the aborting of the transmission of the message at step 1022 and determination of processing at END 1016.

FIG. 11 shows a table where each row represents a different message priority selectable by the originating user in accordance with an embodiment of the present invention. This information is stored in memory associated with the ES application. The left column shows a value that is placed in byte 5 of the ES format regardless of which ES client application, e.g. Peanut, Walnut, Brazil Nut, etc., is used to transmit the message and regardless of which message format, e.g. SMS, MMS, email, etc., is used. Each ES client application capable of transmitting messages of different message formats. The middle column shows an assigned color for the each priority that will be displayed as the background color against which the alphanumeric characters of the message will be shown to the message recipient. The right column describes the condition that each priority represents.

In addition to displaying a background color indicative of the message priority, the value of the priority byte may be utilized by the ES application for other purposes and functions. For example, the type of encryption/decryption utilized for a message may be determined based on the value of the priority byte, e.g. values 1-4 may be interpreted by the ES application to utilize a default type of message encryption/decryption with the corresponding background colors shown in FIG. 11, while values 5-8 causes the ES application to utilize a different type of message encryption/decryption with the display of the same background colors as for values 1-4, respectively.

Also the value of the priority byte can indicate a message security level, e.g. the value 9 may cause a black background color to be displayed with the message and cause the ES application to utilize a higher level or different encryption/decryption technique such as requiring a dynamic key exchange or a user entered encryption/decryption key in order to encrypt/extract the clear text message. For example, when the originating party selects BLACK as a priority indication, the originator is prompted to enter a password which is used as a custom encryption key to convert clear text message to cipher text that is transmitted to the destination party. On the receiving end, an incoming message with a BLACK priority is received and stored in the cipher text mode. To convert the cipher text message with an associated BLACK priority to clear text, the receiving party will be prompted to enter a password as part of a dynamic key exchange, where the password entered by the receiving party must be the same password used by the originator or a decryption password associated with the encryption password utilized by the originator as part of a linked encryption/decryption key. The described encryption/decryption technique and the storage of the message as cipher text for priority value 9 (BLACK) priority messages differ from the priority values 1-4 and 5-8 in that the encryption/decryption of messages associated with the other priorities is processed automatically in accordance with the ES application and the corresponding messages are displayed and stored in clear text format both at the originating and receiving devices. A received BLACK priority message is stored and displayed as cipher text, and will not be displayed as clear text unless the user enters the required password/key.

Message priorities as implemented by an embodiment of the present invention are ubiquitous. A message of a specified priority, e.g. green, is displayed with the same priority indicia to the recipient regardless of transport layer communication protocol used to transport the message, i.e. whether the message was conveyed via SMS, MMS, email, etc. Further, message priority is uniform across all modules of the ES application so a "red" priority SMS message originated by a Peanut module and a "red" priority SMS message originated by a Brazil Nut module are displayed with the same priority indicia to the recipient even though the received message is processed by different modules of the ES application. The originating device using the ES application saves sent messages with the corresponding priorities and displays sent messages with the same priority indicia as presented to the recipient. Hence, users can easily discern by the display of sent messages the priority that was associated with each.

Figure 12:
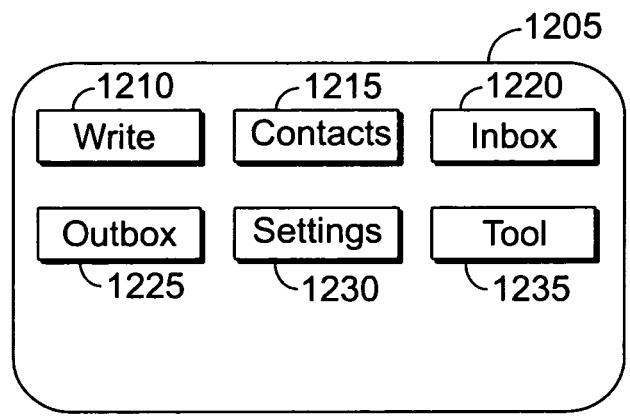
FIG. 12 is an exemplary view of a home screen of an enhanced services module as displayed on a wireless mobile unit providing a graphical user interface in accordance with an embodiment of the present invention.

FIG. 12 shows an exemplary view of a home screen of an enhanced services module, e.g. Peanut module, providing a graphical user interface for a wireless mobile unit. The exemplary screen 1205 represents a home or base screen that provides a graphical user interface for the Peanut module of the enhanced services application. The illustrative displayed icons include WRITE 1210, CONTACTS 1215, INBOX 1220, OUTBOX 1225, SETTINGS 1230, and TOOLS 1235. These icons are user selectable and provide a link to further graphical user interface screens that can be utilized to control features of the enhanced services application and input user data. Selecting the WRITE icon provides a gateway for the user to reach the screen shown in FIG. 15 that supports the composition and input of the message under the control of the originating user. Selecting the SETTINGS icon provides a gateway for the user to reach the screen shown in FIG. 13 in which the user can choose various global settings to be applied during the operation of the enhanced services application. Similarly, the other icons shown in FIG. 12 provide gateways to other corresponding graphical user interfaces for functions corresponding to the name of the icon. The enhanced services application also supports other known user selectable features associated with the processing of received messages, e.g. such as "save to file", "copy", "archive", and/or "printout" which perform the actions represented by the name of the feature. These features may be accessed from a GUI within the INBOX as messages are selected by the user.

Figure 13:
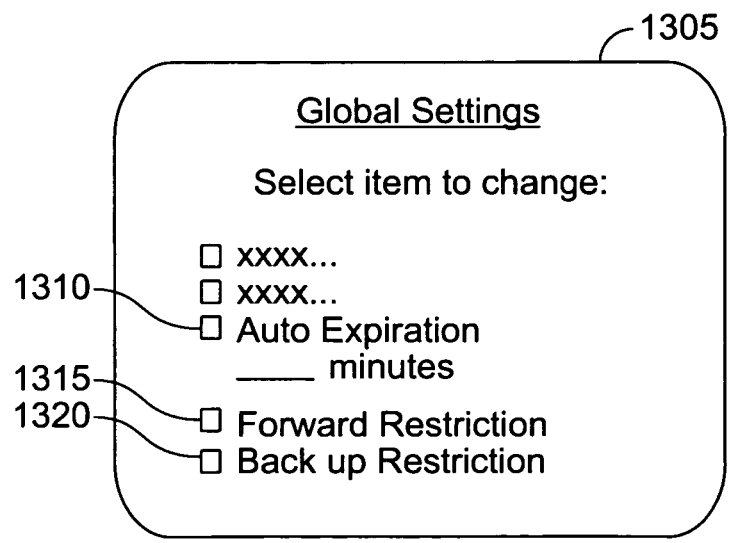
FIG. 13 is an exemplary view of a graphical user interface screen reached through selection of the SETTINGS icon as shown in FIG. 12.

FIG. 13 shows an exemplary view of a graphical user interface screen 1305 reached through selection of the SETTINGS icon 1230 shown in FIG. 12. This screen in combination with submenus and/or other screens lower in a hierarchy of screens enable the user to control various global settings associated with the enhanced services application. Relevant to the present discussion are the global settings associated with the Automatic Expiration feature 1310 and Forward Restriction feature 1315 and Backup Restriction feature 1320. These features may be activated/deactivated by the user selecting/deselecting an associated check-box as shown next to the named feature. Upon the selection of the Automatic Expiration feature, the user will be permitted to enter a numeric value, e.g. indicating the number of minutes, for the time interval associated with this feature. Alternatively, the numeric value can be a future date/time upon which the message will expire. This is the time interval during which a recipient will be able to view a clear text message. At the expiration of the numeric value, the recipient will no longer be able to display the clear text message, e.g. automatic deletion of the clear text message. Selecting the Forward and/or Backup Restriction feature will impose the respective forward and backup restriction as explained earlier on messages delivered to the recipient's device.

Figure 14:
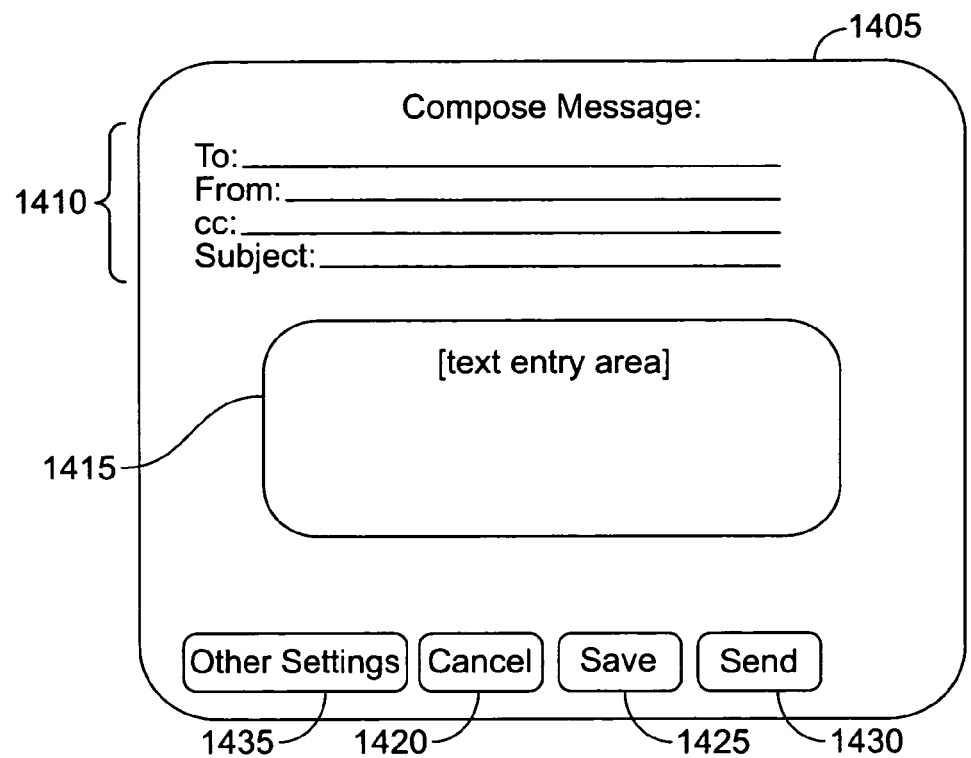
FIG. 14 is an exemplary view of a message composition screen providing a graphical user interface which may be reached through selection of the WRITE icon as shown in FIG. 12.

FIG. 14 shows an exemplary view of a Peanut message composition screen 1405 which may be reached through selection of the WRITE icon shown in FIG. 12. Fields 1410 may comprise what is commonly referred to as header information, e.g. "To" containing the address of the recipient(s); "From" containing the address of the originator; "cc" containing the address of any other recipients to which the message may be copied; "Subject" containing a label or description provided by the originator as to the subject of the message. As will be understood, the fields containing addresses may contain the actual destination address of the recipient(s) or a label associated with a stored contact record that contains the destination address. The screen 1405 contains an area 1415 in which the originating user inserts alphanumeric characters and/or information that forms the body of the message to be conveyed to the recipients. The CANCEL button 1420, SAVE button 1425, and the SEND button 1430 perform the respective indicated functions when selected by the user. An OTHER SETTINGS button 1435 is provided to allow the user to select an other settings/features to be utilized for the message being composed that is different from the global default priority. Selecting other features via button 1435 during the composition of the subject message and before the SEND button 1430 is selected to initiate transmission of the message, will cause a selection screen similar to that shown in FIG. 13 (Global Settings) to be displayed, except that the features entered via this screen are only effective for the current message being composed, i.e. these settings over ride the global settings for this message.

The wireless mobile unit in one example employs one or more computer-readable signal-bearing tangible media. The computer-readable signal-bearing tangible media store software, firmware and/or assembly language for performing one or more portions of one or more embodiments of the invention. The computer-readable signal-bearing tangible medium may contain stored data in the form of magnetic, electrical, optical, biological, and atomic information. For example, the computer-readable signal-bearing tangible medium comprise floppy disks, magnetic tapes, CD-ROMs, DVD-ROMs, hard disk drives, and electronic memory.

Although exemplary implementations of the invention have been depicted and described in detail herein, it will be apparent to those skilled in the art that various modifications, additions, substitutions, and the like can be made without departing from the spirit of the invention. It is preferred that the recipient of a message for which the Automatic Expiration feature is activated be alerted to this fact. For example, an "E" (for Expiration) can be displayed to the recipient in the summary listing and/or displayed header of the received message to alert the recipient that this feature is active for the subject message. Further, the header of such a message can display the starting and ending time as defined by the time interval of the Automatic Expiration feature so that the recipient will be aware of the time in which the clear text version of the message can be viewed, i.e. when the automatic deletion of the message is set to occur. Similarly, an "R" (for Restricted) can be displayed to the recipient in the summary listing and/or displayed header of the received message to alert the recipient that the Forward and Backup Restriction feature is active for the subject message.

The scope of the invention is defined in the following claims.

We claim:

1. A method for processing by a first end-user communication device a received electronic communication, the method comprising the steps of:
   receiving the electronic communication by the first end-user communication device where the electronic communication comprises a digital packet having a user message and an automatic expiration command, the automatic expiration command representing that access to the user message is to be inhibited after a time specified by the automatic expiration command;
   under the control of an enhanced services application program, displaying the user message on a screen of the first end-user communication device after determining that access to the user message is not to be inhibited pursuant to the automatic expiration command;
   upon determining by the enhanced services application program that access to the user message is to be inhibited pursuant to the automatic expiration command, preventing the user message from being accessed by the first end-user communication device;
   restoring messages to an inbox of the first end-user communication device from a file created by storage of messages previously contained in the inbox, one of the messages stored in the file having an automatic expiration command indicating that the one message is to expire at a specified date and time, the restoring step including determining by the enhanced services application proam for each stored message prior to the message being restored in the inbox if an automatic expiration command is present in the message,
   upon determining that the one stored message contains an automatic expiration command that specifies a date and time that has already occurred preventing the one message from being restored to the inbox.

2. A computer program product, comprising a computer usable non-transitory tangible medium having a computer readable program code embodied therein, said computer readable program code adapted to be executed by a first end-user communication device to implement a method for processing a received electronic communication, the method comprising:
   receiving the electronic communication by the first end-user communication device where the electronic communication comprises a digital packet having a user message and an automatic expiration command, the automatic expiration command representing that access to the user message is to be inhibited after a time specified by the automatic expiration command;
   displaying the user message on a screen of the first end-user communication device after determining that access to the user message is not to be inhibited pursuant to the automatic expiration command;
   upon determining that access to the user message is to be inhibited pursuant to the automatic expiration command, preventing the user message from being accessed by the first end-user communication device;
   restoring messages to an inbox of the first end-user communication device from a file created by storage of messages previously contained in the inbox, one of the messages stored in the file having an automatic expiration command indicating that the one message is to expire at a specified date and time, the restoring step including determining by the enhanced services application program for each stored message prior to the message being restored in the inbox if an automatic expiration command is present in the message,
   upon determining that the one stored message contains an automatic expiration command that specifies a date and time that has already occurred preventing the one message from being restored to the inbox.

3. An end-user wireless communication device that processes a received electronic communication, the device comprising:
   a microprocessor controlled apparatus receives the electronic communication by the first end-user communication device where the electronic communication comprises a digital packet having a user message and an automatic expiration command, the automatic expiration command representing that access to the user message is to be inhibited after a time specified by the automatic expiration command;

the microprocessor controlled apparatus generates, under the control of an enhanced services application program, the user message for display on a screen of the first end-user communication device after determining that access to the user message is not to be inhibited pursuant to the automatic expiration command;

upon the microprocessor controlled apparatus determining, under the control of the enhanced services application program, that access to the user message is to be inhibited pursuant to the automatic expiration command, preventing the user message from being accessed by the first end-user communication device;

the microprocessor controlled apparatus restores messages to an inbox of the first end-user communication device from a file created by storage of messages previously contained in the inbox, one of the messages stored in the file having an automatic expiration command indicating that the one message is to expire at a specified date and time, the restoring including determining by the enhanced services application program for each stored message prior to the message being restored in the inbox if an automatic expiration command is present in the message, upon determining that the one stored message contains an automatic expiration command that specifies a date and time that has already occurred preventing the one message from being restored to the inbox.

4. A method implemented by a telecommunication message server for restoring user messages to an inbox of a first end-user communication device, the method comprising the steps of:

receiving user messages from the inbox of the first end-user communication device and storing the user messages to await an inbox restoration request by the first end-user communication device;

receiving an inbox restoration request from the first end-user communication device representing a request to transfer the stored user messages to the first end-user communication device;

under the control of an enhanced services application program operating on the telecommunication message server, determining whether an automatic expiration command is contained in each of the stored user messages where the automatic expiration command indicates that access to the user message is to be inhibited after a time specified by the automatic expiration command, and determining for each user message containing an automatic expiration command if the time specified by the automatic expiration command has expired;

under the control of the enhanced services application program transmitting to the first end-user communication device the stored user messages than do not contain an automatic expiration command and user messages that contain an automatic expiration command with a specified time that has not expired so that user messages than contain an automatic expiration command with a specified time that has expired are not transmitted to the first end-user communication device and hence the latter messages are not restored to the inbox of the first end-user communication device.

5. A computer program product, comprising a computer usable non-transitory tangible medium having a computer readable program code embodied therein, said computer readable program code adapted to be executed by a telecommunication message server to implement a method for restoring user messages to an inbox of a first end-user communication device, the method comprising:

receiving user messages from the inbox of the first end-user communication device and storing the user messages to await an inbox restoration request by the first end-user communication device;

receiving an inbox restoration request from the first end-user communication device representing a request to transfer the stored user messages to the first end-user communication device;

under the control of an enhanced services application program operating on the telecommunication message server, determining whether an automatic expiration command is contained in each of the stored user messages where the automatic expiration command indicates that access to the user message is to be inhibited after a time specified by the automatic expiration command, and determining for each user message containing an automatic expiration command if the time specified by the automatic expiration command has expired;

under the control of the enhanced services application program transmitting to the first end-user communication device the stored user messages than do not contain an automatic expiration command and user messages that contain an automatic expiration command with a specified time that has not expired so that user messages than contain an automatic expiration command with a specified time that has expired are not transmitted to the first end-user communication device and hence the latter messages are not restored to the inbox of the first end-user communication device.

6. A telecommunication message server that restores user messages to an inbox of a first end-user communication device, the server comprising:

a microprocessor controlled apparatus that receives user messages from the inbox of the first end-user communication device and stores the user messages to await an inbox restoration request by the first end-user communication device;

microprocessor controlled apparatus receiving an inbox restoration request from the first end-user communication device representing a request to transfer the stored user messages to the first end-user communication device;

the microprocessor controlled apparatus, under the control of an enhanced services application program, determining whether an automatic expiration command is contained in each of the stored user messages where the automatic expiration command indicates that access to the user message is to be inhibited after a time specified by the automatic expiration command, and determining for each user message containing an automatic expiration command if the time specified by the automatic expiration command has expired;

the microprocessor controlled apparatus under the control of the enhanced services application program transmitting to the first end-user communication device the stored user messages than do not contain an automatic expiration command and user messages that contain an automatic expiration command with a specified time that has not expired so that user messages than contain an automatic expiration command with a specified time that has expired are not transmitted to the first end-user communication device and hence the latter messages are not restored to the inbox of the first end-user communication device.

* * * * *